(12) United States Patent
Deschamps et al.

(10) Patent No.: US 12,458,594 B2
(45) Date of Patent: Nov. 4, 2025

(54) INJECTABLE WATER-IN-OIL EMULSIONS AND USES THEREOF

(71) Applicants: Institut Gustave Roussy, Villejuif (FR); Centre National de la Recherche Scientifique, Paris (FR); Universite Paris-Saclay, Saint-Aubin (FR)

(72) Inventors: Frédéric Deschamps, Paris (FR); Thierry De Baere, Chevilly Larue (FR); Lambros Tselikas, Charenton Le Pont (FR); Thomas Isoardo, Bourg-La-Reine (FR); Nicolas Huang, Paris (FR); Laurence Moine, Saint Cloud (FR); Nicolas Tsapis, Paris (FR); Elias Fattal, Paris (FR)

(73) Assignees: Institut Gustave Roussy, Villejuif (FR); Centre National de la Recherche Scientifique, Paris (FR); Université Paris-Saclay, Saint-Aubin (FR)

( * ) Notice: Subject to any disclaimer, the term of this patent is extended or adjusted under 35 U.S.C. 154(b) by 0 days.

(21) Appl. No.: 16/630,456

(22) PCT Filed: Jul. 16, 2018

(86) PCT No.: PCT/EP2018/069272
§ 371 (c)(1),
(2) Date: Jan. 12, 2020

(87) PCT Pub. No.: WO2019/016138
PCT Pub. Date: Jan. 24, 2019

(65) Prior Publication Data
US 2021/0113463 A1 Apr. 22, 2021

(30) Foreign Application Priority Data
Jul. 17, 2017 (FR) ...................................... 1756773

(51) Int. Cl.
*A61K 9/107* (2006.01)
*A61K 31/4745* (2006.01)
(Continued)

(52) U.S. Cl.
CPC .......... *A61K 9/107* (2013.01); *A61K 31/4745* (2013.01); *A61K 31/555* (2013.01);
(Continued)

(58) Field of Classification Search
None
See application file for complete search history.

(56) References Cited

U.S. PATENT DOCUMENTS 6,592,883 B1    7/2003    Gers-Barlag
2016/0346202 A1   12/2016   Caroline

FOREIGN PATENT DOCUMENTS

CN    105817152 A    8/2016
CN    106255503 A   12/2016
(Continued)

OTHER PUBLICATIONS

Machine Translation, WO 00/76525 (Year: 2000).*
(Continued)

*Primary Examiner* — Lakshmi S Channavajjala
(74) *Attorney, Agent, or Firm* — B. Aaron Schulman, Esq.; Stites & Harbison, PLLC

(57) ABSTRACT

The present invention relates to a water-in-oil emulsion comprising a continuous oil phase and an aqueous phase dispersed in the form of drops, the said aqueous phase comprising polyester-based nanoparticles and at least one therapeutic agent.

10 Claims, 13 Drawing Sheets

(51) Int. Cl.
  *A61K 31/555* (2006.01)
  *A61K 31/704* (2006.01)
  *A61K 47/44* (2017.01)
  *B82Y 5/00* (2011.01)

(52) U.S. Cl.
  CPC ............ *A61K 31/704* (2013.01); *A61K 47/44* (2013.01); *B82Y 5/00* (2013.01)

(56) References Cited

FOREIGN PATENT DOCUMENTS

| | | | | |
|---|---|---|---|---|
| EP | 3542827 | A1 | 9/2019 | |
| JP | H10158152 | | 6/1998 | |
| JP | 2001089319 | A | 4/2001 | |
| JP | 2005503398 | A | 2/2005 | |
| JP | 2008208045 | A | 9/2008 | |
| JP | 2016516824 | A | 6/2016 | |
| JP | 2017505326 | | 2/2017 | |
| JP | 2017505326 | A | 2/2017 | |
| JP | 2018534310 | A | 11/2018 | |
| WO | WO-0076525 | A1 * | 12/2000 | ............... C07H 3/04 |
| WO | 2014006349 | | 1/2014 | |
| WO | 2015118113 | | 8/2015 | |
| WO | 2016126387 | | 8/2016 | |
| WO | 2017/087520 | A1 | 5/2017 | |
| WO | WO-2018093037 | | 5/2018 | |

OTHER PUBLICATIONS

Mirakabad et al., "PLGA-Based Nanoparticles as Cancer Drug Delivery Systems", Asian Pac J Cancer Prev, 15(2), pp. 517-535 (Year: 2014).*
Qi et al. Systematiac studies of pickering emulsions stabilized by uniform-sized PLGA particles: preparation and stabilization mechanism. Journl of Materials Chemistry B, 2:7605-7611 (Year: 2014).*
International Search Report issued in connection with PCT/EP2018/069272 on Oct. 18, 2018.
Feng Qi et al., "Systematic studies of Pickering emulsions stabilized by uniform-sized PLGA particles: preparation and stabilization mechanism"; J. Mater. Chem. B, 2, pp. 7605-7611, 2014.
Catherine P. Whitby et al., "Poly(lactic-co-glycolic acid) as a particulate emulsifier", Journal of Colloid and Interface Science 375, pp. 142-147, 2012.
Yunqi Yang et al., "An overview of Pickering emulsions: solid-particle materials, classification, morphology and applications", Frontiers in Pharmacology, vol. 8, Article 287, 2017.
F. Deschamps et al., "Stabilization improves theranostic properties of Lipiodol-based emulsion during liver trans-arterial chemo embolization in a VX2 rabbit model", Cardiovasc Intervent Radiol, vol. 40, pp. 907-913, 2017.
Translation of Chinese OA dated Apr. 2, 2022.
Yang Jisheng, pp. 66-67, Southeast University Press, Dec. 31, 2012.
Lee, et al, "PLA micro-and nano-particles", 2016, p. 176-191, vol. 107, Advanced Drug Delivery Reviews.
Preliminary Search Report dated Mar. 21, 2018 in corresponding French Application 1756773.

* cited by examiner

INJECTABLE WATER-IN-OIL EMULSIONS AND USES THEREOF

The object of the present invention relates to water-in-oil therapeutic emulsions that are stable and injectable. It also relates to the use of said emulsions in particular for the treatment of cancer.

Hepatic arterial chemo-embolisation is the standard treatment for certain liver tumours, such as inoperable hepatocellular carcinoma and hypervascular metastases. This treatment consists of the combination of an injection of the chemotherapy medicine (in general doxorubicin) with an ischemic arterial embolisation, directly in the tumour arteries. The chemotherapy medicine is released in a slow and sustained manner in tumour arteries thanks to the use of a vector within which the chemotherapy medicine has previously been "loaded". This vector should ideally have diagnostic properties (visibility in imaging) as well as therapeutic properties (controlled and sustained release of the chemotherapy medicine medicine). However, none of the vectors currently used (Lipiodol® or loaded beads) has this theranostic property (diagnostic and therapeutic). The loaded beads are polyvinyl alcohol based microspheres which can be loaded with a chemotherapy medicine (ion exchange mechanism) and are available in different sizes ranging from 70 to 700 μm. These beads have already demonstrated a significant increase in exposure to the tumour chemotherapy medicine and a decrease in systemic toxicity, but they do not contain contrast agents. Thus, it is not possible to view with any precision the administration of the chemotherapy medicine during the procedure and to quantify the concentration of the chemotherapy medicine in the tumour after the procedure. In addition, to date it is only possible to load the beads with doxorubicin and irinotecan.

Lipiodol is used for its hydrophobic (oil) radio-opaque contrast agent properties that are visible under X-ray fluoroscopy and for its selectivity for tumour arteries. The production of chemotherapy emulsions with Lipiodol therefore serves to fuel the hope for a selective and visible delivery of the chemotherapy medicine in hepatic tumours. However, the theranostic properties of these lipiodolated emulsions are limited by their low stability: the phase separation between the chemotherapy drug and lipiodol takes place within a few minutes. Very rapidly, the two phases of the emulsion separate from each other and the chemotherapy drug which is soluble in water disappears almost in its entirety from the tumour. In addition, as the emulsification is obtained by repetitive pumping of 2 syringes (1 of the chemotherapy medicine and 1 of lipiodol) by a three-way stopcock, the technique is not reproducible from one operator to another. This poor stability results in a random concentration of the chemotherapy drug in tumour tissue. Although various techniques (mixer, ultrasound, emulsifying agents) and various types of lipiodol emulsion (water-in-oil as opposed to oil-in-water, different ratios of lipiodol and chemotherapy medicine) have been used in preclinical studies in order to improve the stability and reproducibility of the emulsion, none of them have been successful.

Up to the present time, synthetic surfactants have been used in order to stabilise pharmaceutical emulsions. However, this type of emulsifying agent directly or indirectly raises toxicity and environment related problems. In particular, during parenteral administration, a certain cytotoxicity and hemolytic behaviour of these agents have been observed.

The object of the present invention is therefore to provide a novel therapeutic water-in-oil emulsion, that is stable over time, in particular for a period of at least 24 hours.

The object of the present invention is also to provide a novel stable emulsion preferably having theranostic properties.

The object of the present invention is also to provide a novel stable emulsion comprising at least one anticancer agent, and having a greater degree of tumour selectivity than conventional emulsions.

The object of the present invention is also to provide a novel emulsion which it is possible to load with various therapeutic agents and which is potentially viewable by means of magnetic resonance imaging (MRI).

The object of the present invention is also to provide a novel biodegradable, biocompatible emulsion which is less toxic or less irritating than the usual emulsions that are stabilised with synthetic surfactants or mineral particles.

Thus, the present invention relates to a water-in-oil emulsion comprising a continuous oily phase and an aqueous phase dispersed in the form of drops, the said aqueous phase comprising polyester-based nanoparticles, and at least one therapeutic agent.

Oily Phase

The emulsion according to the invention comprises a continuous oily phase (or fatty phase).

According to one embodiment, the oily phase according to the invention comprises at least one oil. The oily phase may be comprised of one single oil or a mixture of a plurality of different oils.

Any oil or any suitable pharmaceutical oil may be used in order to constitute the oily phase.

The term "oil" is understood to refer to a non-aqueous compound, that is immiscible with water, and liquid at ambient temperature (25° C.) and atmospheric pressure (760 mm Hg).

Among the oils that are suitable according to the invention, mention may be made in particular, of fatty acids, fatty acid esters, and mineral oils (in particular such as squalene).

Mention may also be made of marine oils, in particular fish oils, and in particular salmon oil. Mention may, for example, be made of ethyl icosapentate which is one of the polyunsaturated fatty acids contained in fish oil.

The oily phase according to the invention preferably comprises injectable oils, preferably injectable plant oils.

Among the injectable oils, mention may be made of those that are well known to the person skilled in the art, in particular such as described in the article by Hippamgaonkar et al. (2010) AAPS Pharm Sci Tech, 11(4), p. 1526-1540.

According to one embodiment, the oily phase according to the invention comprises long chain triglycerides (LCT) and/or medium chain triglycerides (MCT). Among the LCTs, mention may be made of triolein, soybean oil, safflower oil, sesame oil and castor oil. Among the MCTs mention may be made of fractionated coconut oil, indeed such as triglycerides of caprylic/capric acids, such as the products MIGLYOL 810° or 812® Neobee® M-5 or Captex® 300.

Mention may be made also of triglycerides of caprylic/capric/linoleic acids (MIGLYOL 818®), triglycerides of caprylic/capric/succinic acids (MIGLYOL 829®), or even MIGLYOL 840® (International Nomenclature of Cosmetic Ingredients (INCI) name: propylene glycol dicaprylate/dicaprate).

According to one embodiment, the oily phase comprises at least one plant oil, in particular castor oil, sesame oil, poppy seed oil, olive oil, soybean oil, coconut oil, triolein and the mixtures thereof.

According to one embodiment, the oily phase comprises at least one oil which has been modified with iodine so as to make it radio-opaque. Among these oils, mention may be made of poppy seed oil, linseed oil (see J Pharm Sci, 102: 4150, 2013), Labrafac WL1349 (Attia et al., Macromol Biosci, 2017), castor oil (ACS Nano, 8 (10), 10537, 2014) or even vitamin E.

According to one embodiment, the oily phase comprises ethyl esters of iodised fatty acids from poppy seed oil, and in particular is constituted of Lipiodol.

Lipiodol is constituted of ethyl esters of iodised fatty acids from poppy seed oil. It contains 43 to 53% iodine. It is prepared by saponification of poppy seed oil, which releases the fatty acids in the form of soaps which are subsequently iodised by iodine chloride and finally esterified by ethanol. The poppy seed oil is extracted from black poppy seeds (*Papaver somniferum*). The main fatty acids comprised in this oil are linoleic acid and linolenic acid. Lipiodol is also used as a contrast agent in the context of radiological investigations.

According to one embodiment, the oily phase comprises triglycerides having medium chain lengths, in particular comprising between 8 and 12 carbon atoms, or a mineral oil composed mainly of squalene.

According to one embodiment, the oily phase of the emulsion according to the invention in addition includes a compound, wherein 100% of its mass comprises, from 10% to 95% of a mineral oil that includes:
  from 0.05% 10% of hydrocarbon chains having less than 16 carbon atoms;
  from 0.05% to 5% of hydrocarbon chains having more than 28 carbon atoms;
  and having a P/N ratio, corresponding to the ratio of the mass quantity of the paraffinic (type) hydrocarbon chains to the mass quantity of the naphthenic (type) hydrocarbon chains, of between 2 and 6.

According to one embodiment, the oily phase of the emulsion according to the invention may comprise at least one compound selected from the MONTANIDE products marketed by SEPPIC such as those described in patent application FR 2 955 776.

The oily phase of the emulsion according to the invention may also comprise at least one surfactant.

According to one embodiment, the ratio between the volume of oily phase and the volume of aqueous phase is between 4:1 and 3:3. Preferably, this ratio is equal to 4:1, 3:1, 2:1, 3:2, or 3:3 and is preferably 3:1.

According to one embodiment, the emulsion according to the invention comprises from 40% to 80%, preferably from 60% to 80%, by weight of oily phase in relation to the total weight of the said emulsion.

Aqueous Phase

The emulsion according to the invention comprises a dispersed aqueous phase.

The aqueous phase according to the invention comprises at least water.

According to one embodiment, the emulsion according to the invention comprises from 20% to 60%, preferably from 20% to 40%, by weight of aqueous phase in relation to the total weight of the said emulsion.

The aqueous phase according to the invention is in the form of droplets, of sizes greater than one micron.

According to one embodiment, the size of the droplets of the aqueous phase is between 10 µm and 100 µm, preferably between 20 µm and 50 µm.

Nanoparticles

The aqueous phase of the invention comprises at least one polyester-based nanoparticle.

The use of solid particles in the formulation of an emulsion makes it possible to reduce, or even avoid, the use of synthetic surfactants, and very stable interfaces are obtained. Such emulsions stabilised by means of solid particles are referred to as Pickering emulsions. Pickering emulsions retain the basic properties of conventional emulsions that are stabilised by surfactants, in a manner such that a conventional emulsion may be substituted with a Pickering emulsion in most applications. Their "surfactant-free" nature makes them very attractive, in particular for biomedical applications such as chemo-embolisation.

According to one embodiment, the nanoparticles according to the invention are biodegradable.

The biodegradable polyester-based nanoparticles are used as solid particles to stabilise the water/oil interface in emulsions. These nanoparticles have low toxicity and a limited inflammatory response is observed in the presence of these nanoparticles. Thus, the emulsions according to the invention present the advantages of being biodegradable, biocompatible and potentially less toxic or less of an irritant than the usual emulsions that are stabilised with synthetic surfactants or mineral particles.

The nanoparticles according to the invention are polymeric nanoparticles that are well known to the person skilled in the art.

According to the invention, these nanoparticles are solid particles having at least two dimensions of less than 1 µm. Preferably, these nanoparticles are nanospheres with a matrix core having an average of size less than 1 µm (when they are measured by means of light scattering).

Preferably, the nanoparticles have an average size of 200 nm. They are generally comprised between 50 nm and 400 nm and more precisely between 100 nm and 300 nm.

In the context of the present invention, the term "size" refers to the diameter.

According to one embodiment, the emulsions of the invention comprise between 5 and 25 mg/ml, preferably 15 mg/ml, of nanoparticles as defined here above.

The nanoparticles according to the invention are polyester-based. As mentioned here above, they are preferably solid and therefore constituted of at least one polyester.

According to one embodiment, the polyester-based nanoparticles are selected from the group consisting of nanoparticles based on poly lactic acid (polylactide), poly glycolic acid (polyglycolide), lactide-glycolide copolymers (with different lactide/glycolic ratios), lactide-glycolide-co-polyethylene glycol copolymers, polyorthoesters, polyanhydrides, polybutylacetone, polyvalerolactone, poly malic acid, polylactones and the mixtures thereof.

According to one embodiment, the polyester-based nanoparticles in addition comprise iron oxide particles, preferably having sizes of between 5 nm and 30 nm, and preferentially equal to 10 nm.

An advantage of making use of Pickering emulsions for the injection is the possibility of making them detectable by MRI, thanks to the oily nature of the vector and/or thanks to the incorporation of iron oxide particles. At the present time, MRI is increasingly being used with patients on account of its accuracy and sensitivity with respect to diagnostics being significantly higher in the detection of hepatocellular carcinomas as compared to the CT scan. Thus, an imaging agent has been introduced into the stabilising nanoparticles used according to the invention. The iron oxide particles are considered to be effective T2 contrast agents. Consequently, according to one embodiment, the therapeutic agent is encapsulated in the interior of the water droplets, while the iron oxide particles are incorporated into the nanoparticles that stabilise these water droplets. Having the therapeutic agent with the iron oxide nanoparticles in a single injectable form makes it possible to monitor what becomes of the drug therapy following administration.

Therapeutic Agent

The emulsion according to the invention comprises at least one therapeutic agent.

According to the invention, the said therapeutic agent is encapsulated within the droplets of the aqueous phase.

This encapsulation is advantageous in that it provides the means to protect and therefore stabilise certain types of therapeutic agents, in particular fragile molecules such as monoclonal antibodies.

Monoclonal antibodies due to their protein structure may be degraded when they are exposed to heat, light, pH, or with strong agitation, in the presence of certain metals and oils/organic solvents. These are fragile molecules the handling whereof may present risks of aggregation or even denaturation. They risk being altered and denatured while being incorporated into a vector unless there is provision for a system of protection. The currently available emulsions do not serve to enable the transport of these active ingredients and the controlled release thereof. By introducing a physical barrier via the stabilising nanoparticles between the water droplets containing the therapeutic agent and the oil, the antibody remains stable.

According to one embodiment, the therapeutic agent is selected from among immunomodulators, anticancer medicinal products, anti-angiogenic medicinal products, anti-infectious medicinal products, anti-inflammatory medicinal products, imaging contrast agents, radioactive agents and infectious agents.

According to the invention, the term "immunomodulator" refers to a compound that is capable of modulating the immune response.

Among the therapeutic agents, mention may also be made of antibodies targeting tumour antigens. According to the invention, the term "tumour antigen" refers to a molecule that is specifically present on the surface of cells (for example: vascular endothelium growth factor, CTLA-4, PD1 or PDL-1).

According to the invention, the term "anti-angiogenic medicinal product" refers to a medicament that is designed to inhibit the process of growth of new blood vessels (neovascularisation) from preexisting vessels (for example Bevacizumab, Sunitinib or Sorafenib).

According to the invention, the term "anti-infective medicinal product" refers to a medicament that is intended for the treatment of infections of microbial origin (antibiotics, anti-viral medicines or anti-fungal medicines for example). Among the antibiotics, mention may be made, for example, of amoxicillin or cefazolin.

According to the invention, the term "anti-inflammatory medicinal product" refers to a medicament that is intended for the treatment of inflammations (steroidal and non-steroidal anti-inflammatory medicines). For example, mention may be made of methylprednisolone or ketoprofen.

According to the invention, the term "imaging contrast agent" refers to a substance which artificially increases the contrast thus making it possible to view an anatomical structure or a structure that is naturally slightly or not contrasted. Mention may more particularly be made of iodinated contrast media, MRI contrast media and products or radio-elements.

According to the invention, the term "radio-elements" refers to a chemical element which emits α, β- or γ radiation often accompanied by the emission of high energy photons. These elements are used in nuclear medicine for diagnostic purposes at low doses, and for therapeutic purposes at high doses in order to treat cancers (Technetium-99m, Fluorine-18, Iodine-123, Yttrium-90, Iodine-131 or Holmium-166 for example).

According to the invention, the term "infectious agent" refers to a biological agent that is responsible for causing an infectious disease (such as bacteria, viruses, prions, yeasts and parasites).

According to one embodiment, the emulsion according to the invention comprises, by way of therapeutic agent, at least one anticancer medicine.

Preferably, the anticancer medicine is selected from the group consisting of alkylating agents, platinum derivatives, cytotoxic antibiotic agents, antimicrotubule agents, anthracyclines, topoisomerase type I and II inhibitors, fluoropyrimidines, cytidine analogues, adenosine analogues, methotrexate, folinic acid, enzymes, antivascular agents, anti-angiogenic agents, antimitotic agents, in particular spindle poison agents, kinase inhibitors, hormones, monoclonal antibodies, radioelements, oncolytic viruses and the mixtures thereof.

Among the alkylating agents, mention may be made, for example, of cyclophosphamide, melphalan, ifosfamide, chlorambucil, busulfan, thiotepa, prednimustine, carmustine, lomustine, semustine, steptozotocin, decarbazine, temozolomide, procarbazine and hexamethylmelamine.

Among the platinum derivatives, mention may in particular be made of cisplatin, carboplatin and oxaliplatin.

Among the cytotoxic antibiotic agents, mention may be made, for example, of bleomycin, mitomycin and dactinomycin.

Among the antimicrotubule agents, mention may in particular be made of vinblastine, vincristine, vindesine, vinorelbine and taxoids (paclitaxel and docetaxel).

Among the anthracyclines, mention may be made of doxorubicin, daunorubicin, idarubicin, epirubicin, mitoxantrone and losoxantrone.

Among the topoisomerase type I and II inhibitors, mention may be made, for example, of etoposide, teniposide, amsacrine, irinotecan, topotecan and tomudex.

Among the antimetabolites, mention may be made of methotrexate or hydroxyurea.

Among the fluoropyrimidines, mention may be made of 5-fluorouracil, UFT or floxuridine.

Among the cytidine analogues, mention may be made of 5-azacytidine, cytarabine, gemcitabine, 6-mercaptomurine and 6-thioguanine.

Among the adenosine analogues, mention may be made, for example, of pentostatin, cytarabine or fludarabine phosphate.

Among the various enzymes and compounds, mention may also be made of L-asparaginase, hydroxyurea, trans-retinoic acid, suramin, dexrazoxane, amifostine, herceptin as well as estrogenic and androgenic hormones.

Among the anti-vascular agents, mention may be made of combretastatin derivatives, for example CA4P, chalcones or colchicine, for example ZD6126, and the prodrugs thereof.

Among the anti-angiogenic agents, mention may be made of bevacizumab, sorafenib or sunitinib malate.

Among the tyrosine kinase inhibitor therapeutic agents, mention may be made of imatinib, gefitinib, sunitinib, sorafenib, vandetanib and erlotinib.

Among the spindle poison agents, mention may be made of vincristine, vinblastine, taxol and taxotere.

Among the radioelements, mention may be made of Technetium-99m, Fluorine-18, Iodine-123, Phosphorus-32, Strontium-89, Yttrium-90, Iodine-131, Holmium-166, Rhenium-186 and Erbium-169

Among the oncolytic viruses, mention may be made of T-VEC.

Preferably, the therapeutic agent is an anticancer medicine selected from the group consisting of doxorubicin, irinotecan, oxaliplatin and the mixtures thereof.

According to one embodiment, the emulsion according to the invention comprises, by way of therapeutic agent, at least one antigen targeting antibody, and more particularly at least one monoclonal antibody.

According to one embodiment, the antibody is a tumour antigen-targeting antibody selected from the group consisting of anti-angiogenic monoclonal antibodies, anti-CTLA-4 monoclonal antibodies, anti-PD-1 monoclonal antibodies, anti-PD-L1 monoclonal antibodies, and the mixtures thereof.

Among the anti-angiogenic monoclonal antibodies, in particular mention may be made of bevacizumab.

Among the anti-CTLA-4 monoclonal antibodies, in particular mention may be made of ipilimumab and tremelimumab.

Among the anti-PD-1 monoclonal antibodies, in particular mention may be made of nivolumab and pembrolizumab.

Among the anti-PD-L1 monoclonal antibodies, in particular mention may be made of Atezolizumab and Avelumab.

According to one embodiment, the emulsion according to the invention comprises between 5 and 25 mg/ml of therapeutic agent.

Preferably, when the emulsion comprises doxorubicin as a therapeutic agent, the concentration of therapeutic agent is between 10 and 25 mg/ml, and is preferably equal to 20 mg/ml.

Preferably, when the emulsion comprises irinotecan as a therapeutic agent, the concentration of therapeutic agent is equal to 20 mg/ml.

Preferably, when the emulsion comprises oxaliplatin as a therapeutic agent, the concentration of therapeutic agent is equal to 5 mg/ml.

Preferably, when the emulsion comprises ipilimumab as a therapeutic agent, the concentration of therapeutic agent is equal to 5 mg/ml.

The present invention also relates to a medicinal product, characterised in that it comprises an emulsion as defined here above.

The present invention also relates to a pharmaceutical composition comprising an emulsion as defined here above, as well as at least one pharmaceutically acceptable excipient.

These pharmaceutical compositions contain an effective dose of at least one emulsion according to the invention (containing at least one therapeutic agent), as well as at least one pharmaceutically acceptable excipient.

The said excipients are selected according to the pharmaceutical form and the desired mode of administration, from the usual excipients which are known to the person skilled in the art.

In the pharmaceutical compositions of the present invention for oral, sublingual, subcutaneous, intramuscular, intravenous, intra-arterial, topical, local, intratracheal, intranasal, transdermal or rectal administration, the emulsion may be administered in the single-unit administration form, in admixture with conventional pharmaceutical excipients, to animals and humans for the treatment of the above disorders or diseases.

In accordance with usual practice, the appropriate dosage for each patient is determined by the physician based on the mode of administration, the weight and the response of the said patient.

The present invention also relates to an emulsion as defined here above for the use thereof as a medicinal product.

The present invention also relates to an emulsion as defined here above for the use thereof in the treatment of cancer.

The present invention, according to another one of its aspects, also relates to a treatment method for treating cancer comprising of the administration, to a patient, of an effective dose of an emulsion according to the invention.

DESCRIPTION OF THE FIGURES

FIG. 5A pertains to the injectability of emulsions through a Progreat 2.4F catheter at different ratios at a rate of 2 mm/s (the curve 'a' corresponds to an emulsion with an oil/water ratio of 8:3; the curve 'b' corresponds to an emulsion with an oil/water ratio of 3:1; the curve 'c' corresponds to an emulsion with an oil/water ratio of 6:1; and the curve 'd' corresponds to Lipiodol alone). FIG. 5B pertains to the injectability of a 3/1 emulsion at different injection rates (a: 6 mm/s; b: 4 mm/s; c: 2 mm/s; and d: 1 mm/s) FIG. 5C pertains to the injectability of emulsions through an 18G needle at different ratios at a rate of 2 mm/s (a: Lipiodol alone; b: 3:2 ratio; c: 6:1 ratio, and d: 8:3 ratio.)

EXAMPLES

Example 1: Preparation of Biodegradable PLGA Nanoparticles

The PLGA nanoparticles were prepared according to the emulsion-evaporation method already disclosed in the literature (Astete, C E; Sabliov, C M Synthesis and Characterisation of PLGA Nanoparticles. *J. Biomater. Sci. Polym. Ed.* 2006, 17(3), 247-289). 100 mg of PLGA were dissolved in 5 ml of dichloromethane and emulsified by sonication (VibraCell sonicator, Fisher Scientific, France) at a power of 40% for 1 minute with 20 ml of an aqueous solution containing 2.5 mg/ml of PVA. The organic solvent was then evaporated at ambient temperature with magnetic stirring for a period of 2 hrs. After evaporation, the NPs were purified by ultracentrifugation (LE-80K Ultracentrifuge Beckman Coulter Optima™) at 4° C., 37,000 g for a period of 1 hr. After removal of the supernatant, the NPs were once again placed in suspension in an aqueous solution containing 50 mg/ml of trehalose (cryoprotectant). Then, the suspension of NPs was lyophilised. Before use, the lyophilised NPs were redispersed in MilliQ water at the desired concentration.

Figure 1:
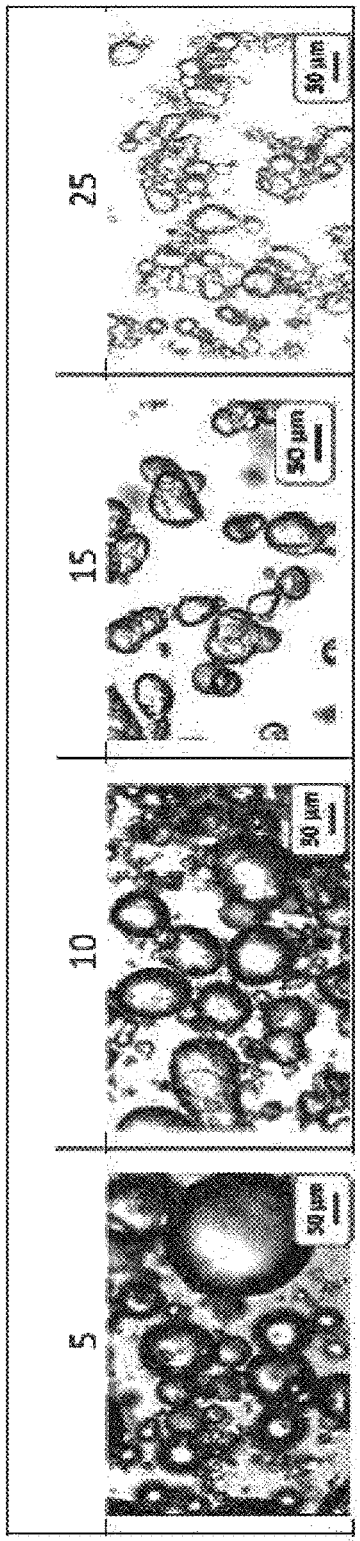
FIG. 1 represents the optical microscopy images of the emulsions obtained at different concentrations of Poly (lactic-co-glycolic acid) (PLGA) nanoparticles.

Example 2: Obtaining a Water-in-Oil Emulsion of Physiological Saline Solution Stabilised by Different Concentrations of PLGA Nanoparticles The emulsions were formulated with a lipiodol (Guerbet, France)/physiological saline solution ratio of 3/1 (v/v) by repetitive pumping (70 push-pull cycles) of two 10 ml syringes through a 3-way stopcock for 70 seconds. The first syringe contains lipiodol, the second is empty and the physiological saline solution disposed in a $3^{rd}$ syringe is gradually introduced into the system via a syringe pump with a flow rate of 1 mL/min. The aqueous phase is a suspension of nanoparticles at different concentrations in the physiological saline solution (see FIG. 1).

Figure 2:
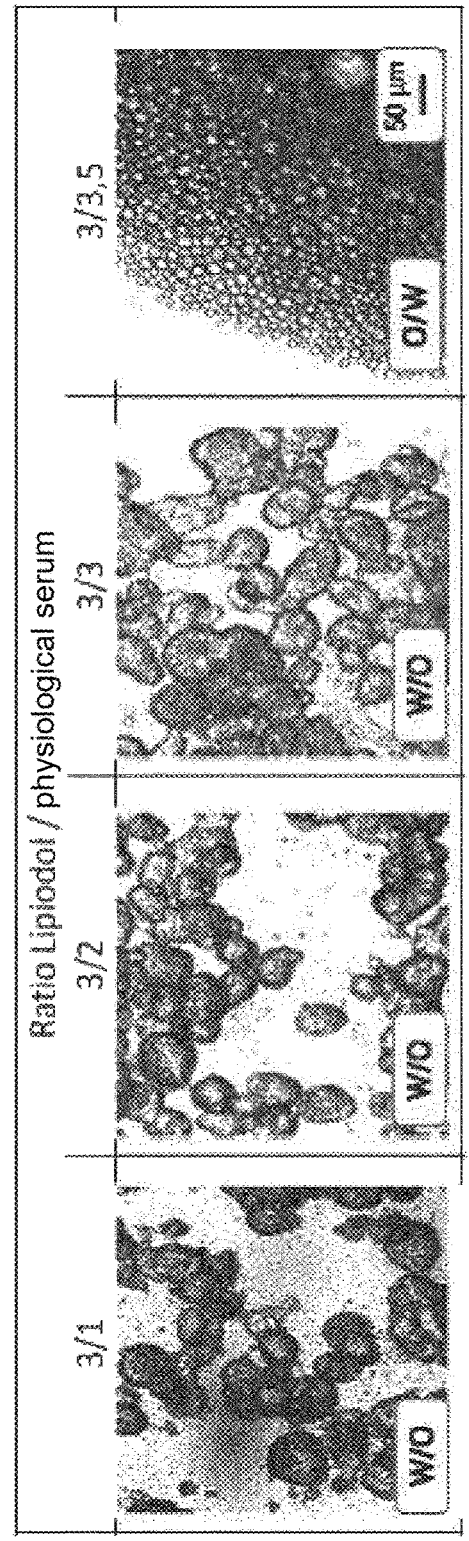
FIG. 2 represents the optical microscopy images of the emulsions obtained at different Lipiodol/physiological saline solution ratios.

Example 3: Obtaining a Water-in-Oil Emulsion of Physiological Saline Solution Stabilised by PLGA Nanoparticles at Different Oil/Water Ratios The emulsions were formulated according to the same protocol as in Example 1 at a concentration of 15 mg/ml nanoparticles with variable lipiodol/physiological saline solution ratios (see FIG. 2).

Example 4: Determination of the Orientation of the Emulsion by a "Drop Test"

For each emulsion, the type of emulsion (water-in-oil or oil-in-water) was determined by a colorimetric test using two solutions, one containing Lipiodol (previously coloured with Sudan red) and the other containing physiological saline solution (previously coloured with methylene blue). A small droplet of one of the solutions was added to a drop of the emulsion tested. The continuous phase of the emulsion was revealed by observing the possible eventual miscibility of the droplets of solutions with the drop of emulsion. The test was carried out immediately after the emulsification.

The colorimetric analysis of an emulsion having 3/1 ratio with 15 mg/ml of nanoparticle by adding dye to the aqueous phase or to the Lipiodol phase, served as the means to demonstrate that the emulsion obtained is of the water-in-oil type. Indeed, the continuous phase of the emulsion drop is coloured by Lipiodol, and not by water.

Figure 3:
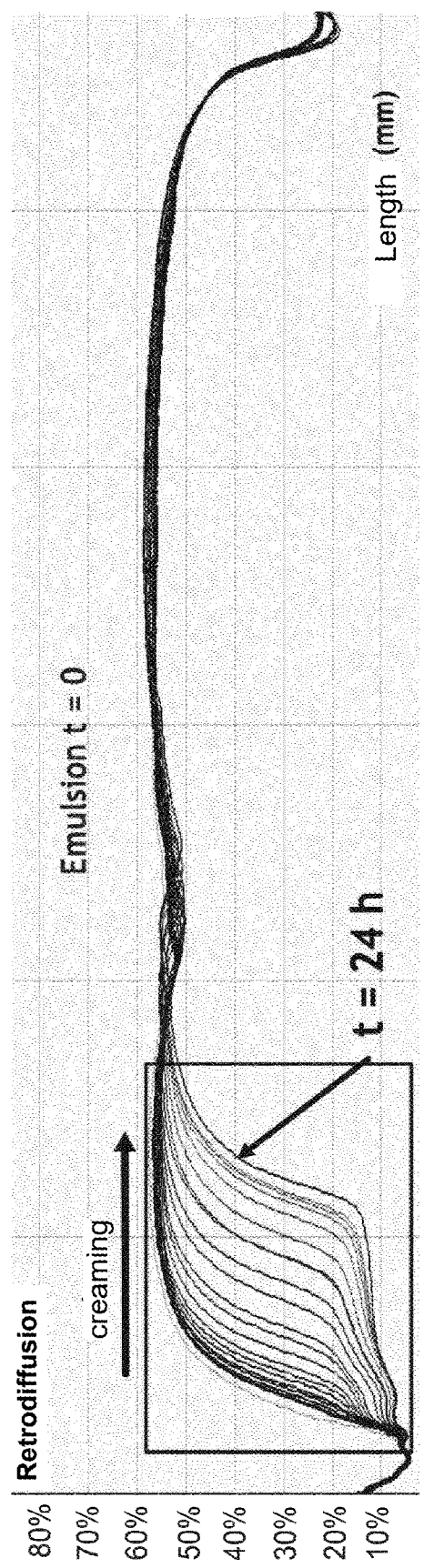
FIG. 3 represents the monitoring of creaming, over a period of 24 hours, of a 3/1 emulsion stabilised with 15 mg/mL of nanoparticles using the Turbiscan.
Figure 4:
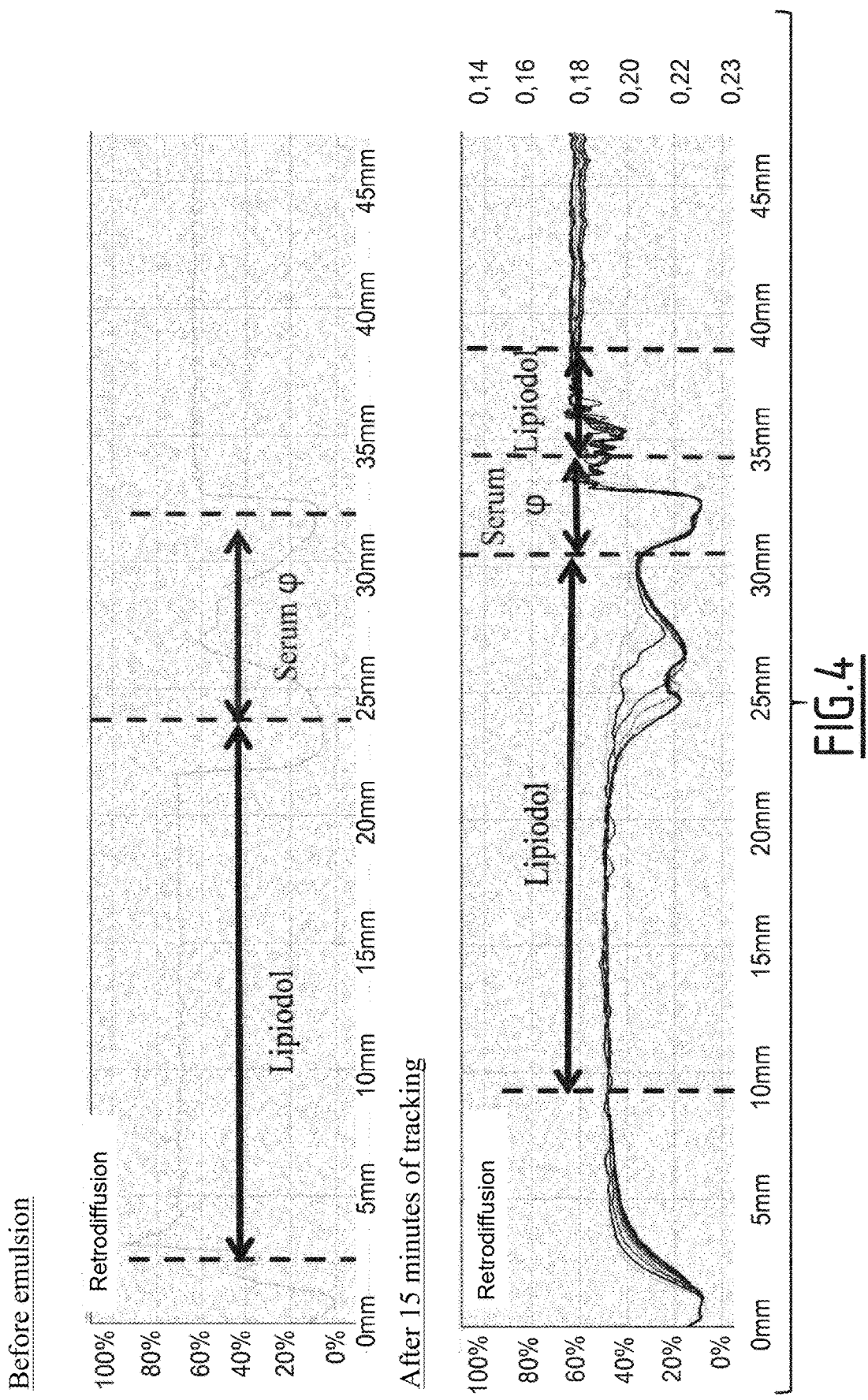
FIG. 4 represents the monitoring of the phase separation, over a period of 15 minutes, of a 3/1 emulsion that is not stabilised by nanoparticles (before emulsion and after 15 minutes of monitoring) using the Turbiscan.

Example 5: Study of the Stability of Emulsions Stabilised by Nanoparticles Vs Non-Stabilised Emulsions The emulsion was analysed by making use of a Turbiscan® MA 2000 (Formulation, L'Union, France). The tube containing the emulsion was not removed from the device nor was it even touched until the end of the measurement in order to avoid any disturbance of the system. The measurements were carried out at predetermined times according to the evolution of the system. This monitoring was carried out until such time as the change in intensities became negligible. The Turbiscan apparatus makes it possible to measure destabilisation phenomena that are reversible (creaming and sedimentation) and irreversible (coalescence and segregation) in the sample without dilution (FIGS. 3 and 4).

Figure 5:
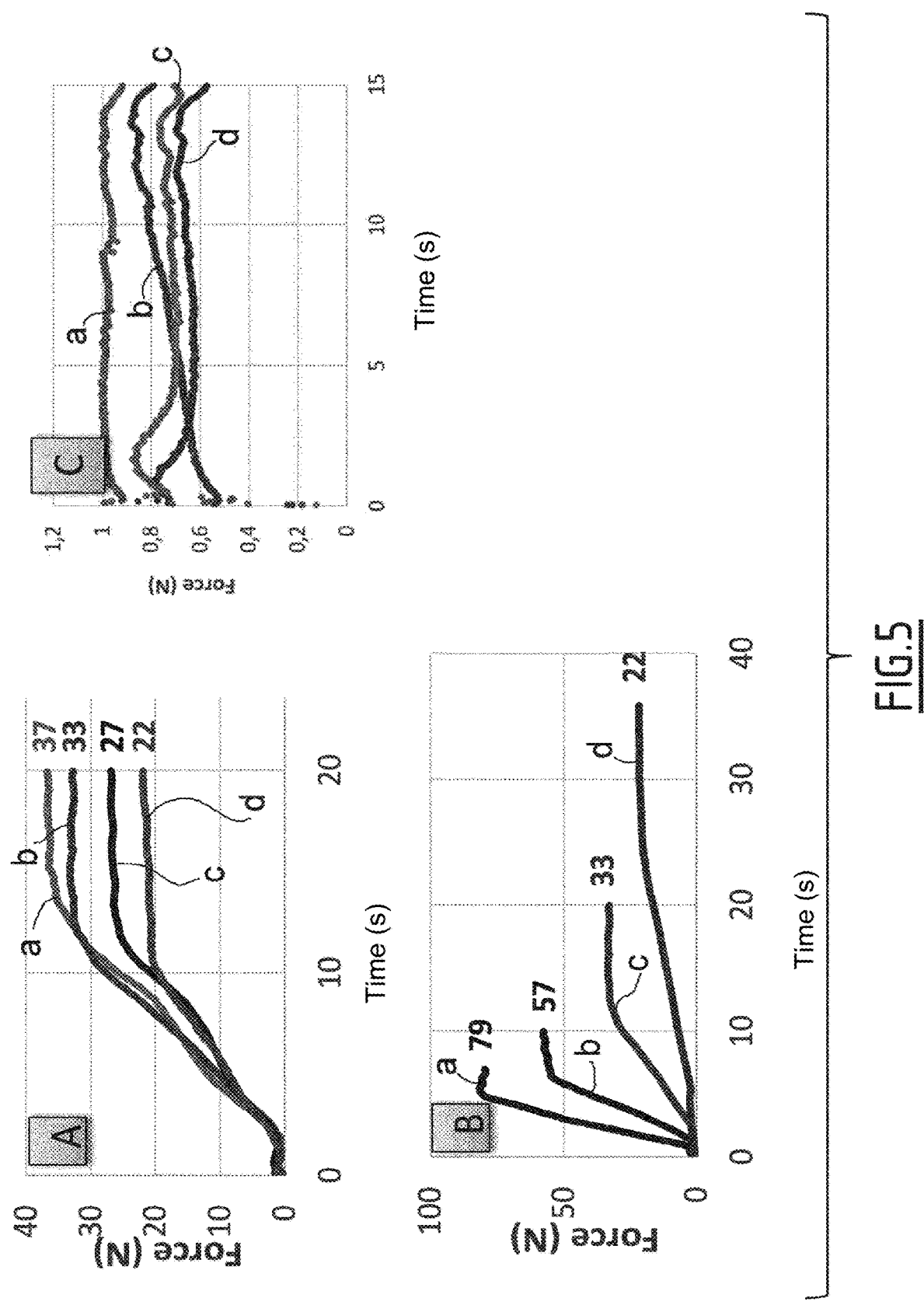
FIG. 5 pertains to the injectability of emulsions.

Example 6: Study of Injectability of Water-in-Oil Emulsions Stabilised by Nanoparticles The injectability of the emulsions was studied by means of the texture analyser (TA-XT2, Texture Technologies). The measurements were performed with 1 ml "Medallion" syringes (Merit®) connected either to a vascular microcatheter (diameter: 2.4 F) or to an 18 gauge needle. Different oil/water ratios (8/3, 3/1, and 6/1) were studied at a rate of 2 mm/s, and for the 3/1 ratio, different rates of injections were tested. The oil alone (Lipiodol) was used as a control (FIG. 5).

Example 7: Obtaining Lipiodolated Water-in-Oil Emulsions Loaded with Doxorubicin Stabilised by Nanoparticles The emulsions were formulated according to the same protocol as in Example 2. The aqueous phase is composed of doxorubicin hydrochloride reconstituted at a concentration of 10 or 20 mg/ml in saline solution (Adriblastine, Pfizer, USA) for the formulation of emulsions. The emulsions were produced using different Lipiodol/doxorubicin ratios, different concentrations of doxorubicin and different concentrations of nanoparticles (see Table 1 below).

| Lipiodol/doxorubicin Ratio | Concentration of doxorubicin (mg/mL) | Concentration of nanoparticles (mg/mL) |
|---|---|---|
| 3/1 | 20 | 20 |
| 2/1 | 20 | 20 |
| 3/1 | 20 | 15 |
| 2/1 | 20 | 15 |
| 3/2 | 20 | 15 |
| 1/1 | 20 | 15 |
| 3/1 | 20 | 10 |
| 3/1 | 10 | 20 |

All of the therapeutic emulsions obtained were of the water-in-oil orientation, that is to say reverse orientation regardless of the conditions used.

Figure 6:
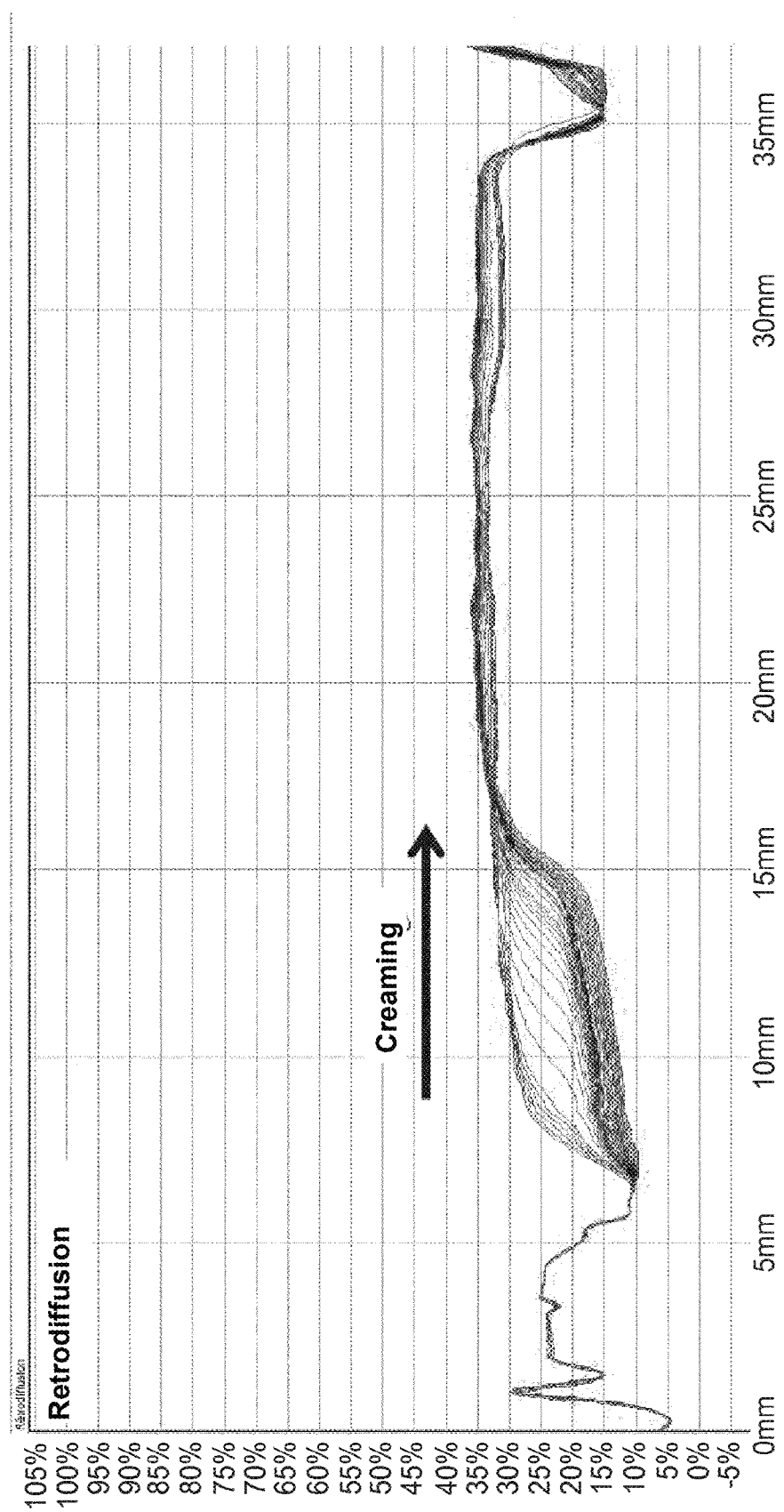
FIG. 6 represents the monitoring of creaming, over a period of 24 hours, of a 3/1 emulsion stabilised with 15 mg/mL of nanoparticles at a concentration of 20 mg/ml doxorubicin, using the Turbiscan.

Example 8: Stability of the Water-in-Oil Lipiodolated Emulsions Loaded with Doxorubicin Stabilised by Nanoparticles The analyses were carried out according to the protocol used for Example 5. The creaming of the various emulsions was rapidly observed with the Turbiscan but without phase separation upon monitoring over a period of 24 hrs (FIG. 6).

Figure 7:
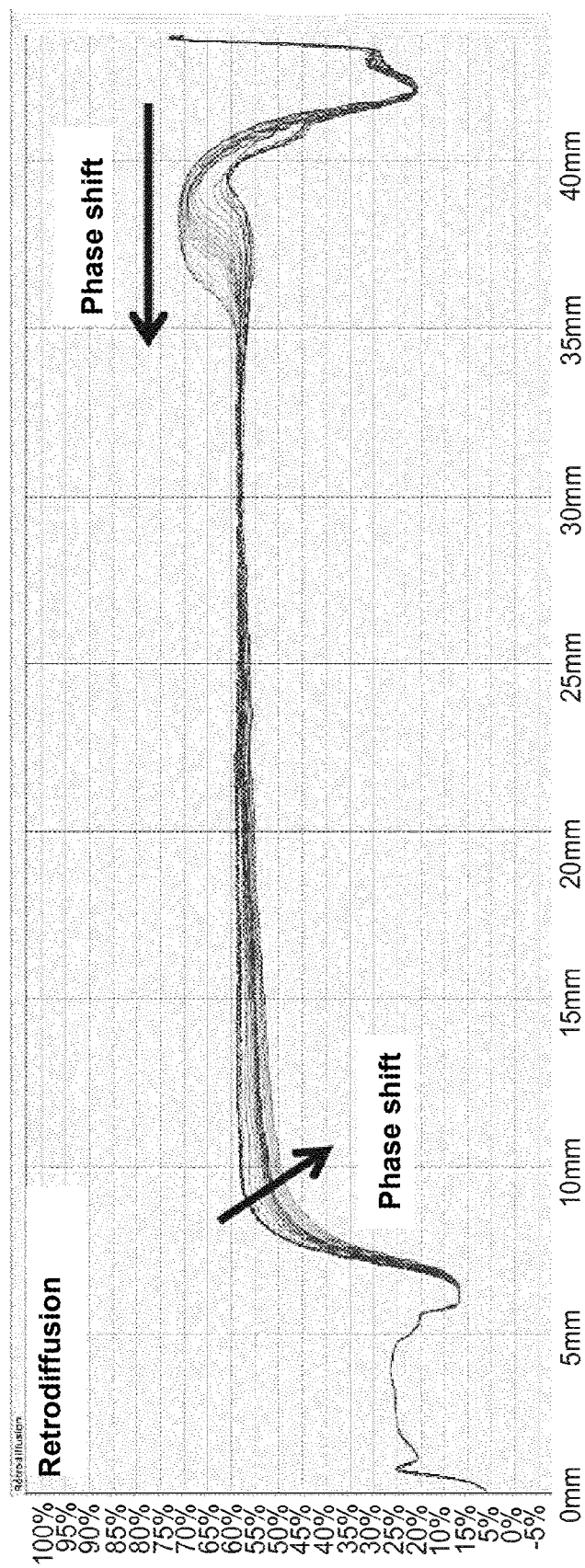
FIG. 7 represents the monitoring of the phase separation, over a period of 4 hours, of a 4/1 emulsion that is not stabilised by nanoparticles at a concentration of 20 mg/ml doxorubicin, using the Turbiscan.

In contrast, the therapeutic emulsions of doxorubicin produced without PLGA nanoparticles showed a very rapid and complete phase separation (<5 hrs) (FIG. 7).

Example 9: Obtaining Water-in-Oil Lipiodolated Emulsions Loaded with Monoclonal Antibodies Stabilised by Nanoparticles The emulsions were formulated according to the same protocol as in Example 2. The aqueous phase is composed of an antibody (5 mg/ml of Ipilimumab, Yervoy, Bristol Myers Squibb). The emulsions were produced with a Lipiodol/ipilimumab ratio of 3/1 with a nanoparticles concentration of 15 mg/ml.

The emulsions obtained emulsions obtained were of the water-in-oil orientation and stable over a number of weeks. No aggregation of antibodies was observed, unlike the emulsions prepared without nanoparticles.

The integrity of the antibodies was checked and verified by means of the western blot method in denaturing condition. The migration was effected on polyacrylamide gel and the samples were prepared with 2% Sodium dodecyl sulfate (SDS) (method known to the person skilled in the art). The electrophoresis was carried out at 120V for a period of 90 minutes and the transfer to the membrane at 100V for a period of 45 minutes. The membrane was washed with ethanol and the revelation of the antibodies was effected with Ponceau red.

The nanoparticles indeed demonstrated their effectiveness in preserving the integrity of the therapeutic agent, ipilimumab in this example.

Example 10: Study of the In Vitro Release of Doxorubicin from Lipiodolated Emulsions Stabilised by Nanoparticles The in vitro release of doxorubicin from lipiodolated emulsions having a 3/1 ratio and loaded with doxorubicin at a concentration of 20 mg/ml (2 types: without nanoparticles, with nanoparticles at 15 mg/ml concentration) or from beads loaded with doxorubicin at a concentration of 25 mg/ml (DC beads, Biocompatible size 300-500 μm) was evaluated. 0.8 mL of emulsion (corresponding to 4 mg of doxorubicin) or 0.16 mL of loaded beads were introduced into GeBAflex tubes (cut-off: 12-14 kDa; Gene Bio-Application Ltd). These tubes were immersed in 40 ml of buffered saline solution (TRIS, pH 7.4) and placed in an incubator at 37° C. at a speed of 150 rpm. At predetermined times, aliquots (80 μL) were collected and replaced with equivalent volumes of TRIS.

Figure 8:
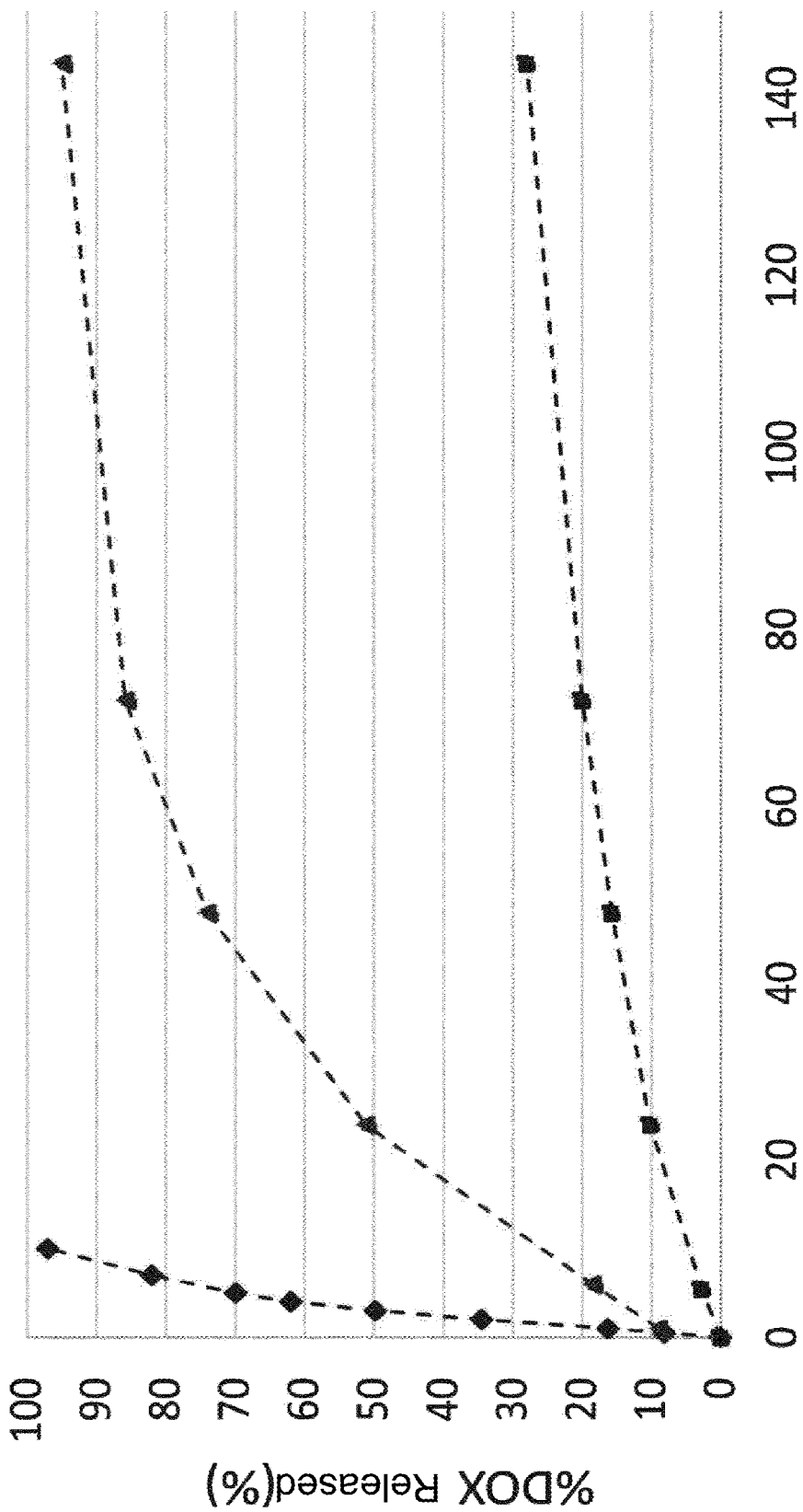
FIG. 8 relates to the in vitro release of doxorubicin from lipiodolated emulsions having 3/1 ratio loaded with doxorubicin at a concentration of 20 mg/ml without nanoparticles (curve with diamond shaped forms) and with nanoparticles at 15 mg/ml concentration (curve with triangles) and loaded beads (curve with squares).

The amounts of doxorubicin released were quantified by measuring optical density at 492 nm in a 96-well microplate (FIG. 8).

Example 11: Study of the In Vitro Release of Irinotecan from Lipiodolated Emulsions Stabilised by Nanoparticles The emulsions were formulated according to the same protocol as in Example 2. The aqueous phase is composed of irinotecan (irinotecan hydrochloride trihydrate, 20 mg/mL; Campto®, Pfizer).

The in vitro release of irinotecan from lipiodolated emulsions (4 types: without nanoparticles ratio of 3/1; with nanoparticles at 15 mg/mL concentration and with ratios of 3/1; 3/2; 1/1), or beads loaded with irinotecan at 20 mg/mL concentration (DC beads, Biocompatible size 300-500 μm) was evaluated. 0.8 mL of emulsion (corresponding to 4 mg, 6.4 mg, and 8 mg of irinotecan for emulsions with ratios 3/1; 3/2; and 1/1 respectively) or 0.08 mL of loaded beads were introduced into GeBAflex tubes (cut-off: 12-14 kDa; Gene Bio-Application Ltd). These tubes were immersed in 40 mL of buffered saline solution (PBS, pH 7.4) and placed in an incubator at 37° C. at a speed of 150 rpm. At predetermined times, aliquots (0.5 mL) were collected and replaced with equivalent volumes of PBS.

Figure 9:
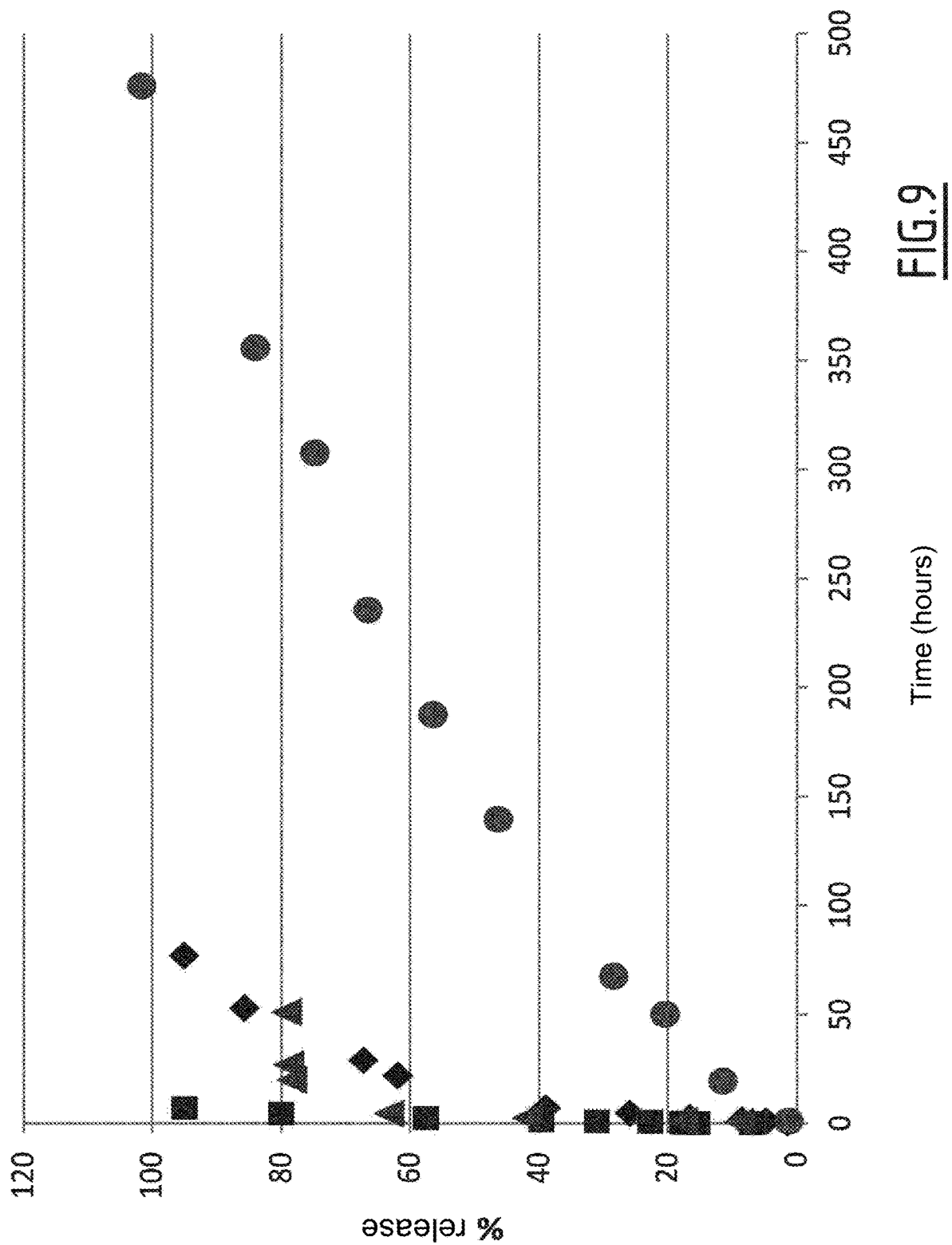
FIG. 9 relates to the in vitro release of irinotecan with emulsions stabilised by nanoparticles (NP) having an irinotecan concentration of 20 mg/mL (round), and a 3/1 ratio compared to an unstabilised emulsion (triangles), having beads loaded with irinotecan (diamond shaped forms) and free irinotecan (squares).
Figure 10:
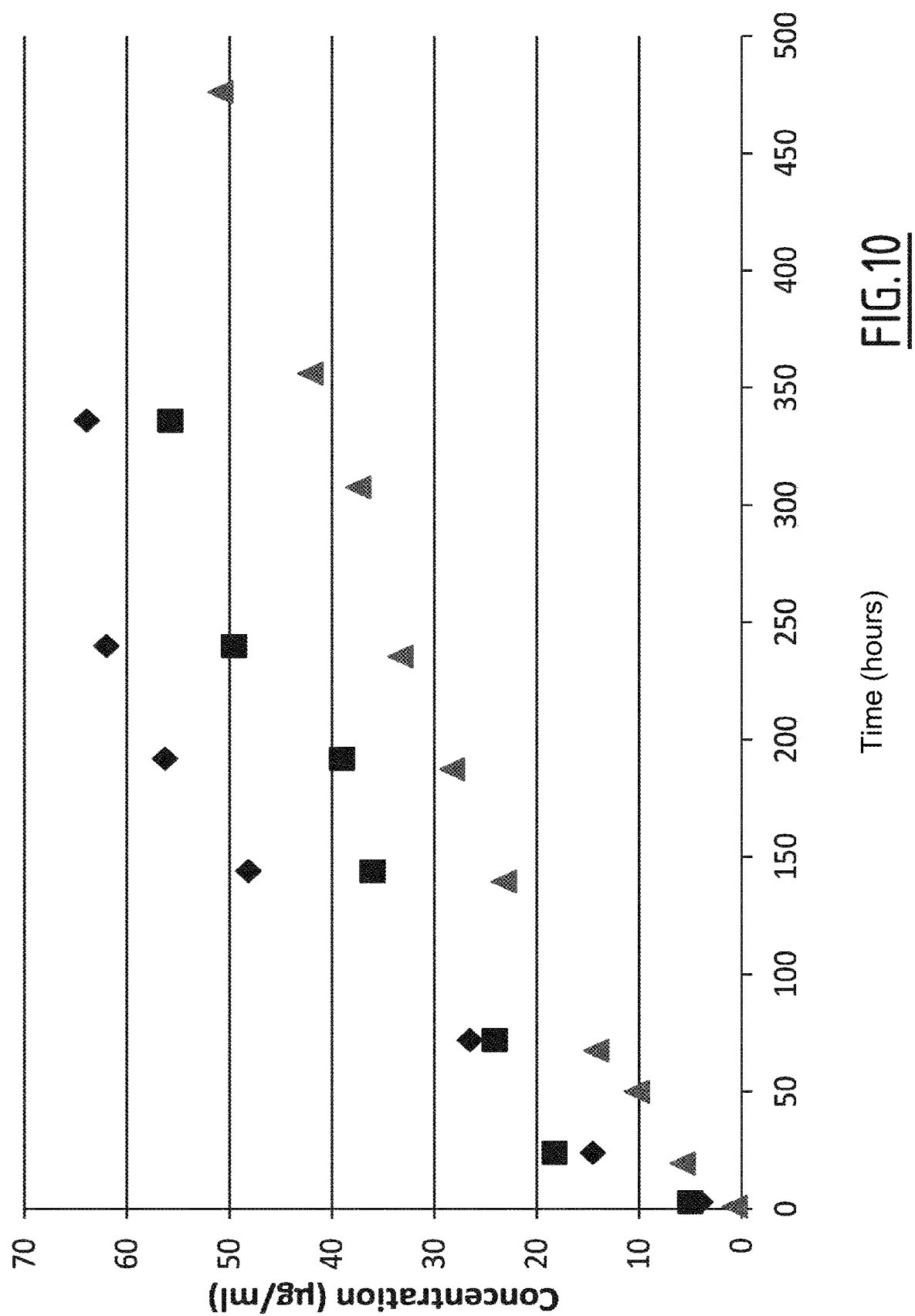
FIG. 10 relates to the in vitro release of irinotecan with emulsions stabilised by NPs having a concentration of 15 mg/mL, and a ratio of 3/1 (triangles), 3/2 (squares) and 1/1 (diamond shaped forms).

The amounts of irinotecan released were quantified by means of UV spectroscopy at 370 nm (FIGS. 9 and 10).

Example 12: Study of the In Vitro Release of Oxaliplatin from Lipiodolated Emulsions Stabilised by Nanoparticles The emulsions were formulated according to the same protocol as in Example 2. The aqueous phase is composed of oxaliplatin (Eloxatin®, 5 mg/mL, Sanofi-Aventis).

The in vitro release of oxaliplatin from lipiodolated emulsions (4 types: without nanoparticles ratio of 3/1; with nanoparticles at 15 mg/mL concentration and with ratios of 3/1; 3/2; 1/1) was evaluated. 0.8 ml of emulsion (corresponding to 1 mg, 1.33 mg, and 2 mg of oxaliplatin for emulsions with ratios 3/1; 3/2; and 1/1 respectively). These tubes were immersed in 40 ml of buffered saline solution (25 mM acetate, pH 6.8) and placed in an incubator at 37° C. at a speed of 150 rpm. At predetermined times, aliquots (0.1 mL) were collected.

Figure 11:
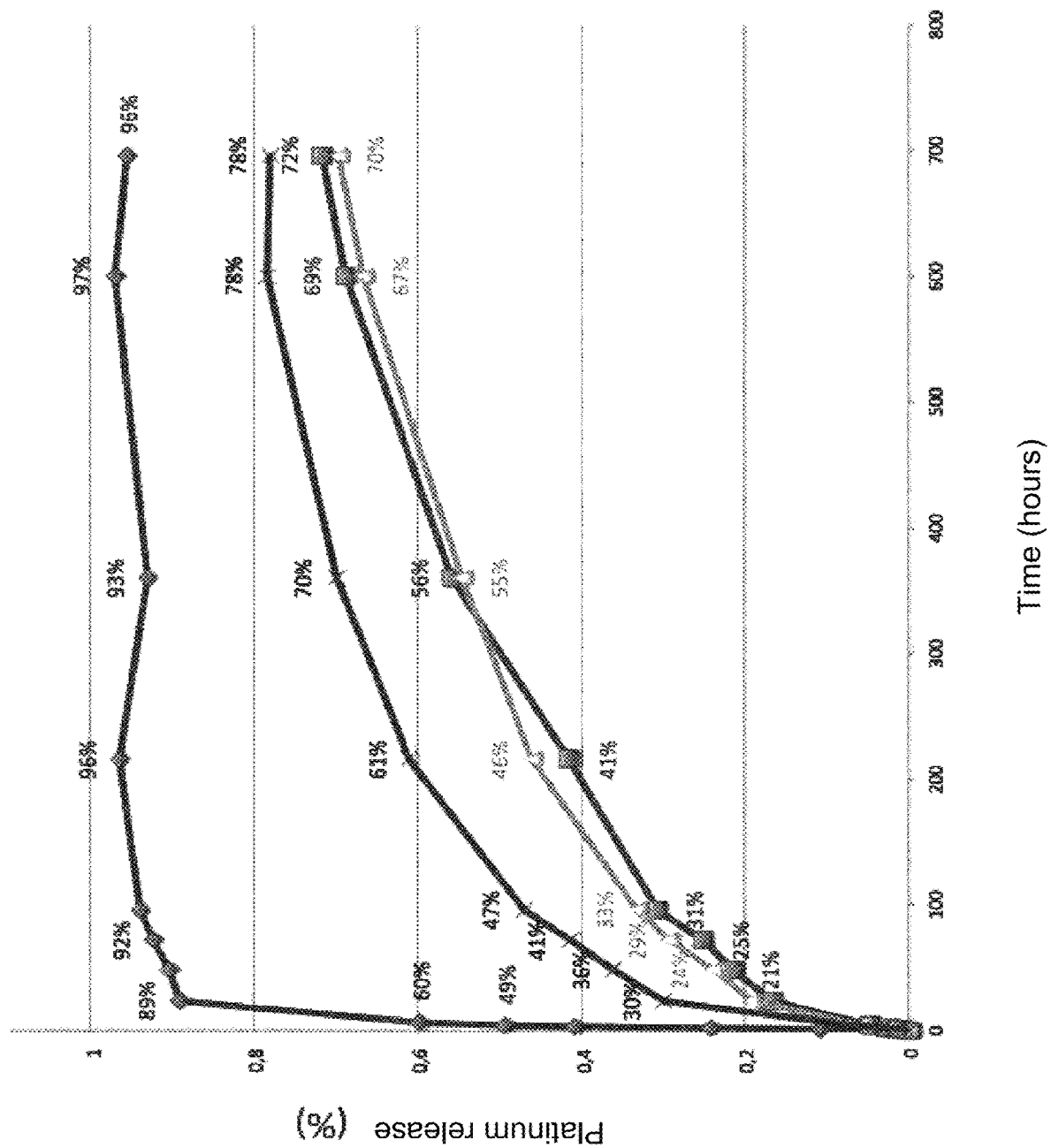
FIG. 11 represents the percentage of in vitro release of platinum with emulsions prepared having different ratios of Lipiodol and oxaliplatin, with or without stabilising nanoparticles. The curve with diamond shaped forms corresponds to a 3/1 ratio without nanoparticles, the curve with squares corresponds to a 3/1 ratio with nanoparticles, the curve with triangles corresponds to a 2/1 ratio with nanoparticles and the curve with the crosses correspond to a 1/1 ratio with nanoparticles.
Figure 12:
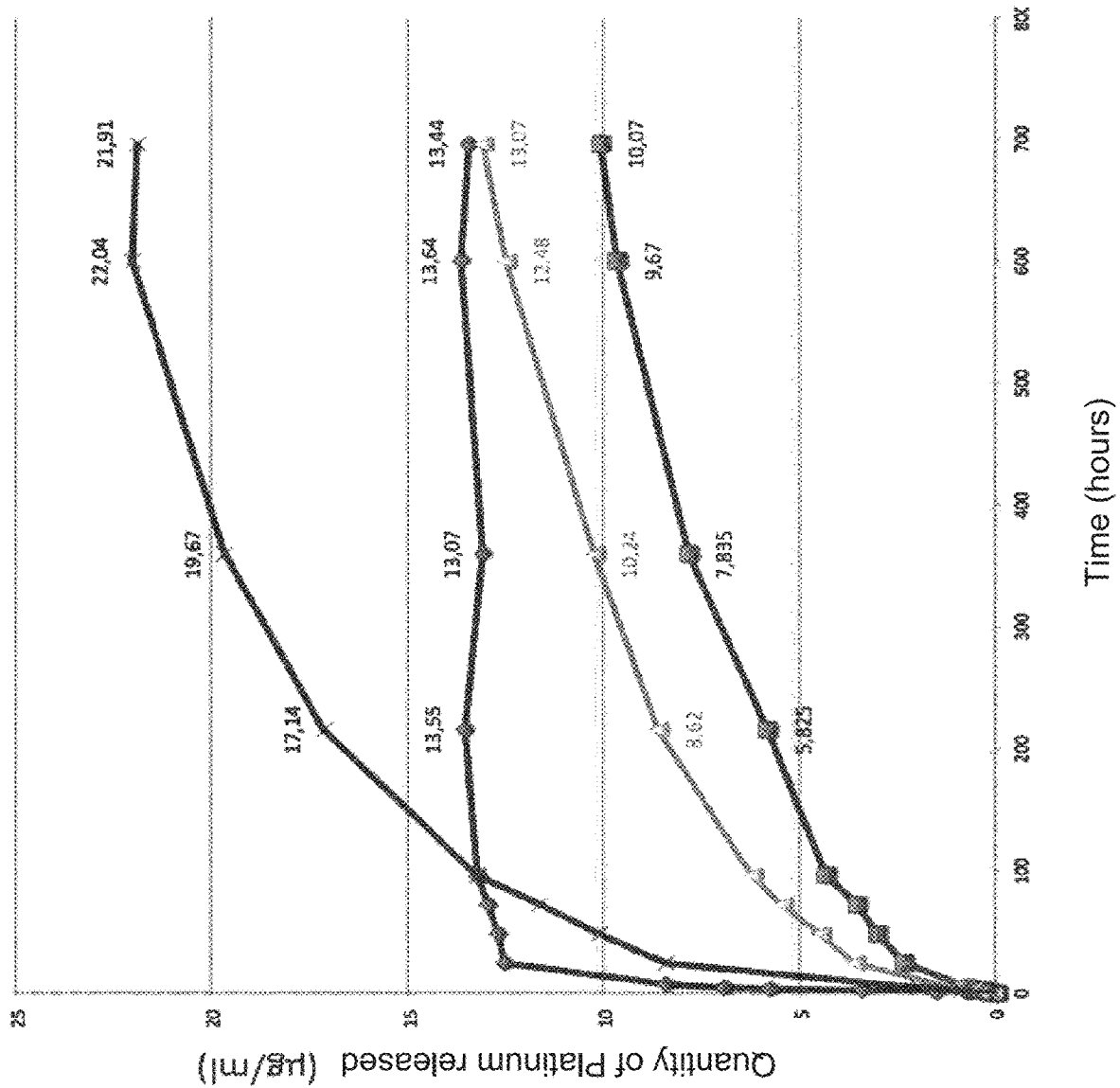
FIG. 12 represents the quantity of platinum released in vitro with emulsions produced with different Lipiodol and oxaliplatin ratios, with or without stabilising nanoparticles. The curve with diamond shaped forms corresponds to a 3/1 ratio without nanoparticles, the curve with squares corresponds to a 3/1 ratio with nanoparticles, the curve with triangles corresponds to a 2/1 ratio with nanoparticles and the curve with the crosses correspond to a 1/1 ratio with nanoparticles.

The quantities of platinum released were quantified by means of Inductively coupled plasma mass spectrometry (ICP-MS) (FIGS. 11 and 12).

Example 13: Water-in-Oil Emulsions Stabilised by Nanoparticles Formulated Based on Different Oils The emulsions were formulated at a 3/1 ratio according to the same protocol as in Example 2. The aqueous phase is composed either of physiological saline solution or doxorubicin at a concentration of 20 mg/mL. The oil phase is made up of either olive oil, sesame oil, castor oil, poppy seed oil or miglyol. All of the emulsions are formulated with nanoparticles having a concentration of 15 mg/ml.

The emulsions are of the water-in-oil type according to the colorimetric test and stable over more than a week.

Example 14: Preparation of Biodegradable PLGA-FeO Nanoparticles

The Poly (lactic-co-glycolic acid)—Iron oxide [PLGA-FeO] nanoparticles were prepared according to the same method described in Example 1. 500 µL of the solution of $Fe_3O_4$ nanoparticles decorated with oleic acid (25 mg mL$^{-1}$, size 10 nm, Ocean, USA) were added to 100 mg of PLGA previously dissolved in 5 mL of dichloromethane and emulsified by sonication (VibraCell sonicator, Fisher Scientific, France) at a power of 40% for 1 minute with 20 mL of an aqueous solution containing 2.5 mg/mL of PVA. The organic solvent was then evaporated at ambient temperature with magnetic stirring for a period of 2 hrs. After evaporation, the suspension was centrifuged at 3000 rpm for 5 min, the supernatant was removed, and the pellet was rinsed with deionised water. The centrifugation process was repeated twice. Then, the NPs were purified by ultracentrifugation (LE-80K Ultracentrifuge Beckman Coulter Optima™) at 4° C., 37,000 g for a period of 1 hr. After removal of the supernatant, the NPs were once again placed in suspension in an aqueous solution containing 50 mg/ml of trehalose (cryoprotectant). Then, the suspension of NPs was lyophilised. Before use, the lyophilised NPs were redispersed in MilliQ water at the desired concentration.

Example 15: Obtaining a Lipiodolated Water-in-Oil Emulsion of Physiological Saline Solution Stabilised by Different Concentrations of PLGA-FeO Nanoparticles The emulsions were formulated according to the same protocol as in Example 2 at different concentrations of PLGA-FeO nanoparticles (20, 15, or 10 mg/mL). The emulsions are of the water-in-oil type according to the colorimetric test.

Example 16: Obtaining a Lipiodolated Water-in-Oil Emulsion of Doxorubicin Stabilised by PLGA-FeO Nanoparticles The emulsion was formulated according to the same protocol as in Example 2 at a concentration of 20 mg/ml of doxorubicin and 15 g/mL of PLGA-FeO nanoparticles. A water-in-oil emulsion was obtained.

Example 17: Microstructure of the Emulsions

The microscopic structure of the emulsions was observed by means of a confocal laser scanning microscope (Leica TCS SP8-STED, Germany) equipped with a WLL laser (488 and 563 nm of excitation waves) and a CS2 63×/1.40 immersion objective lens. In order to prevent the deformation of the emulsion droplets, the sample was placed on a curved glass slide. The PLGA-FeO nanoparticles were used so as to formulate the emulsions in order to be able to view them in transmission (avoids the interference effects with the emission spectrum of doxorubicin). The fluorescence of doxorubicin was observed with a 600-710 nm filter under laser illumination at 590 nm. The red fluorescence emissions were collected in a sequential mode.

Example 18: Evaluation of the MRI Quantification of the Emulsion

The emulsions were evaluated by MRI in order to confirm that this imaging modality effectively served the purpose of quantifying the ratio of oil contained in a tumour phantom.

In order to do this, 9 tumour phantoms were made, each filled with an emulsion containing variable percentages of Lipiodol. Then we performed 3T MRIs for each phantom in the presence of a tube of Lipiodol (acquisition IP-OP and Ideal IQ). Finally, we calculated the percentage of fat in each of the phantoms, taking as reference: Lipiodol=100% (see Table 2 here below).

TABLE 2

Quantification by MRI of the percentage of Lipiodol in emulsions having decreasing levels of Lipiodol.

|   | % real | % calculated in MRI |
|---|--------|---------------------|
| 1 | 88.9   | 91.51               |
| 2 | 85.7   | 87.06               |
| 3 | 80     | 83.11               |
| 4 | 75     | 74.35               |
| 5 | 72.7   | 72.78               |
| 6 | 66.7   | 63.54               |
| 7 | 60     | 65.33               |
| 8 | 57.1   | 59.75               |
| 9 | 54.5   | 60.69               |

Example 19: Obtaining Lipiodolated Water-in-Oil Emulsions Loaded with Active Ingredient The emulsions were formulated according to the same protocol as in Example 2. The aqueous phase is composed of active ingredient previously reconstituted at a therapeutic concentration recommended by the supplier, or composed directly of an active ingredient in aqueous solution at the concentration of the commercially available form. The emulsions were produced based on a Lipiodol/active ingredient in solution ratio of 3/1 with a concentration of 15 mg/ml of nanoparticles.

The aqueous phase is composed of either gemcitabine (40 mg/mL), fludarabine (25 mg/mL), clamoxyl (200 mg/mL), cefazolin (330 mg/mL), sunitinib (0.5 mg/mL), methylprednisolone (10 mg/mL) or ketoprofen (25 mg/mL).

All of the therapeutic emulsions obtained were of the water-in-oil orientation according to the colorimetric test.

Example 20: Size of Drops

The measurement of size of drops was carried out with a particle counter by means of the image analysis technique (Flowcell FC200S+HR, Occhio, Belgium). The emulsion is first of all diluted 20 times in oil and then 0.5 mL of the diluted emulsion is introduced through a 400 µm spacer for analysis. Each sample was measured at least 4 times on (Day) D7 and on different days (D0, D7, D35) for the samples containing physiological saline solution and Ipilimumab. The calculations were done on at least 500 dropl.

TABLE 3

Size of drops of emulsions of Lipiodol/active ingredient
in solution with 15 mg/mL of nanoparticles

| Aqueous phase | [NP] (mg/mL) | Ratio Lipiodol/ aqueous phase | Size of drops (μm) | | |
|---|---|---|---|---|---|
| | | | D 0 | D 7 | D 35 |
| Physiological saline solution | 15 | 3/1 | 41 ± 3 | 42 ± 2 | 43 ± 2 |
| | 15 | 2/1 | 59 ± 3 | 51 ± 6 | 57 ± 2 |
| | 15 | 3/2 | 44 ± 1 | 45 ± 4 | 46 ± 6 |
| | 15 | 1/1 | 53 ± 8 | 46 ± 4 | 46 ± 10 |
| | 5 | 3/1 | 69 ± 17 | 87 ± 30 | 119 ± 42 |
| | 10 | 3/1 | 58 ± 5 | 55 ± 5 | 57 ± 5 |
| | 25 | 3/1 | 24 ± 7 | 17 ± 2 | 27 ± 2 |
| Ipilimumab | 15 | 3/1 | 37 ± 3 | 42 ± 5 | 41 ± 3 |
| Doxorubicin | 15 | 3/1 | / | 54 ± 2 | / |
| Irinotecan | 15 | 3/1 | / | 37 ± 2 | / |
| Gemcitabine | 15 | 3/1 | / | 41 ± 4 | / |
| Fludarabine | 15 | 3/1 | / | 41 ± 2 | / |
| Clamoxyl | 15 | 3/1 | / | 43 ± 7 | / |
| Cefazolin | 15 | 3/1 | / | 59 ± 15 | / |
| Sunitinib | 15 | 3/1 | / | 41 ± 2 | / |
| Methylprednisolone | 15 | 3/1 | / | 45 ± 9 | / |

Figure 13:
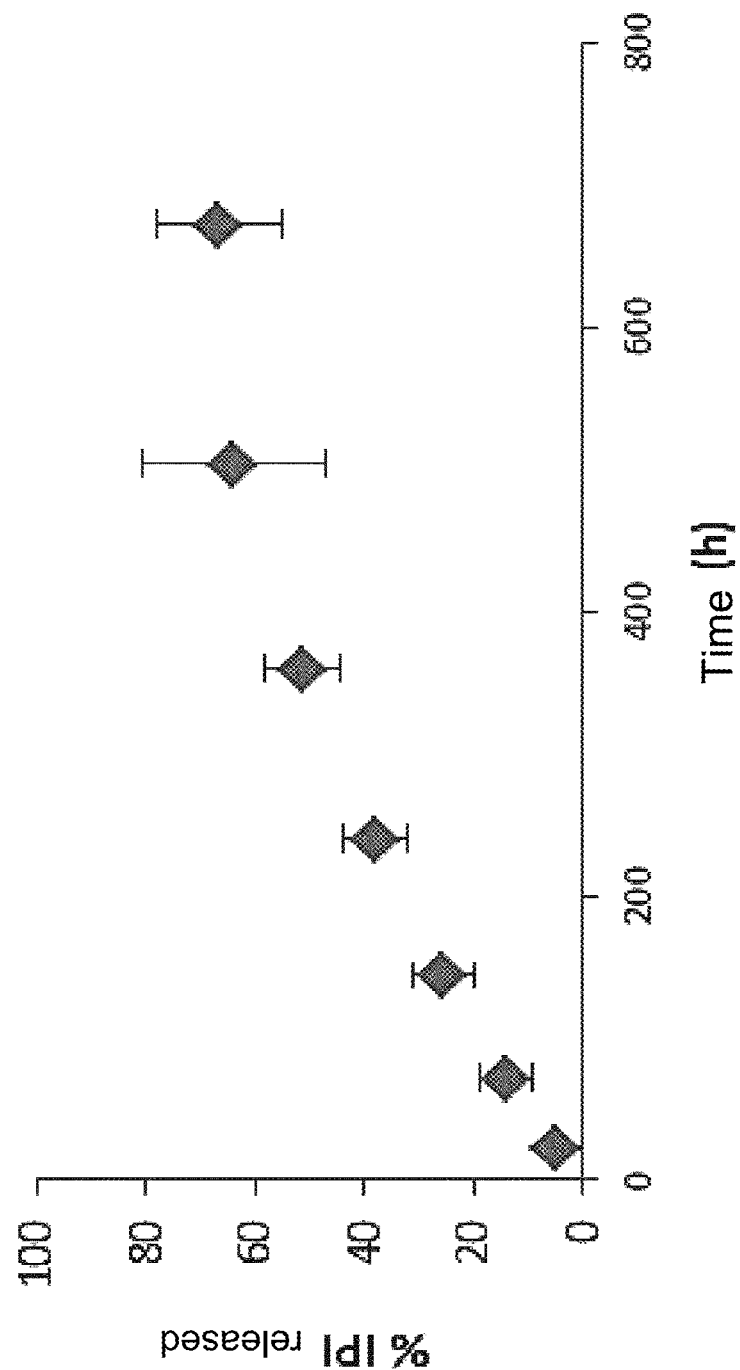
FIG. 13 relates to the in vitro release of ipilimumab from lipiodolated emulsions having 3/1 ratio stabilised by NPs having a concentration of 15 mg/mL.

Example 21: Study of the In Vitro Release of Ipilimumab from Lipiodolated Emulsions Stabilised by Nanoparticles The emulsions were formulated according to the same protocol as in Example 9. The in vitro release of ipilimumab from a lipiodolated emulsion (3/1 ratio, concentration of nanoparticles 15 mg/mL) was evaluated. 0.8 mL of emulsion corresponding to 1 mg of ipilimumab was/were placed in tubes containing 20 mL of buffered saline solution (PBS, pH 7.4) and placed in an incubator at 37° C. at a speed of 150 rpm. At predetermined times, aliquots (300 μL) were collected and replaced with equivalent volumes of PBS. The quantities of ipilimumab released were quantified by the BCA (Bicinchoninic Acid) Protein Assay method: colorimetric protein assay based on bicinchonic acid (FIG. 13).

Example 22: In Vivo Study: Chemoembolisation of the Liver from a Water-in-Oil Lipiodolated Emulsion Loaded with Oxaliplatin The emulsions for this study were formulated according to the same protocol as in Example 12.

The experimental protocol for this study has been validated by the animal experimentation ethics committee. VX2 tumours of the liver were implanted percutaneously on white New Zealand rabbits under general anesthesia (intramuscular injections of Ketamine 20-40 mg/kg and xylazine 3-5 mg/kg, isoflurane 3-5% for induction and 1.5-3% mixed with $O_2$ at 1 L/min for the procedure).

Two weeks after implantation of the VX2 tumour cells, the hepatic intra-arterial injections were performed by an interventional radiologist. This was done under general anesthesia and under fluoroscopic guidance in a room equipped with an X-ray angiography table. First of all, the femoral artery was surgically exposed and catheterised with a 4F vascular angiography catheter. Then, a 2.4F microcatheter was used for selective catheterisation of the left branch of the hepatic artery and to inject 0.5 mL of emulsion (that is 0.625 mg of oxaliplatin).

Samples of venous blood (2 mL) was drawn and taken at 5, 10, 20, 30 and 60 minutes after injection in order to determine the plasma concentration of oxaliplatin. 4 groups of rabbits were prepared:

Group 1: euthanise a conventional oxaliplatin emulsion not stabilised by nanoparticles. This group was euthanised 1 hour after the injection (n=4)

Group 2: Rabbits who received an oxaliplatin emulsion stabilised by nanoparticles. This group was euthanised 1 hour after injection (n=5)

Group 3: Rabbits who received a conventional emulsion of oxaliplatin not stabilised by nanoparticles. This group was euthanised 24 hours after the injection (n=4)

Group 4: Rabbits who received an emulsion of oxaliplatin stabilised by nanoparticles. This group was euthanised 24 hours after the injection (n=5).

Immediately after the euthanasia, an MRI was performed in order to measure and count the tumours. The liver was removed and tissue samples from the right and left liver lobes, as well as the tumours, were dissected separately and homogenised with a mixer for the quantification of platinum. The platinum was assayed by a plasma mass spectrometry method (ICP-MS).

Figure 14:
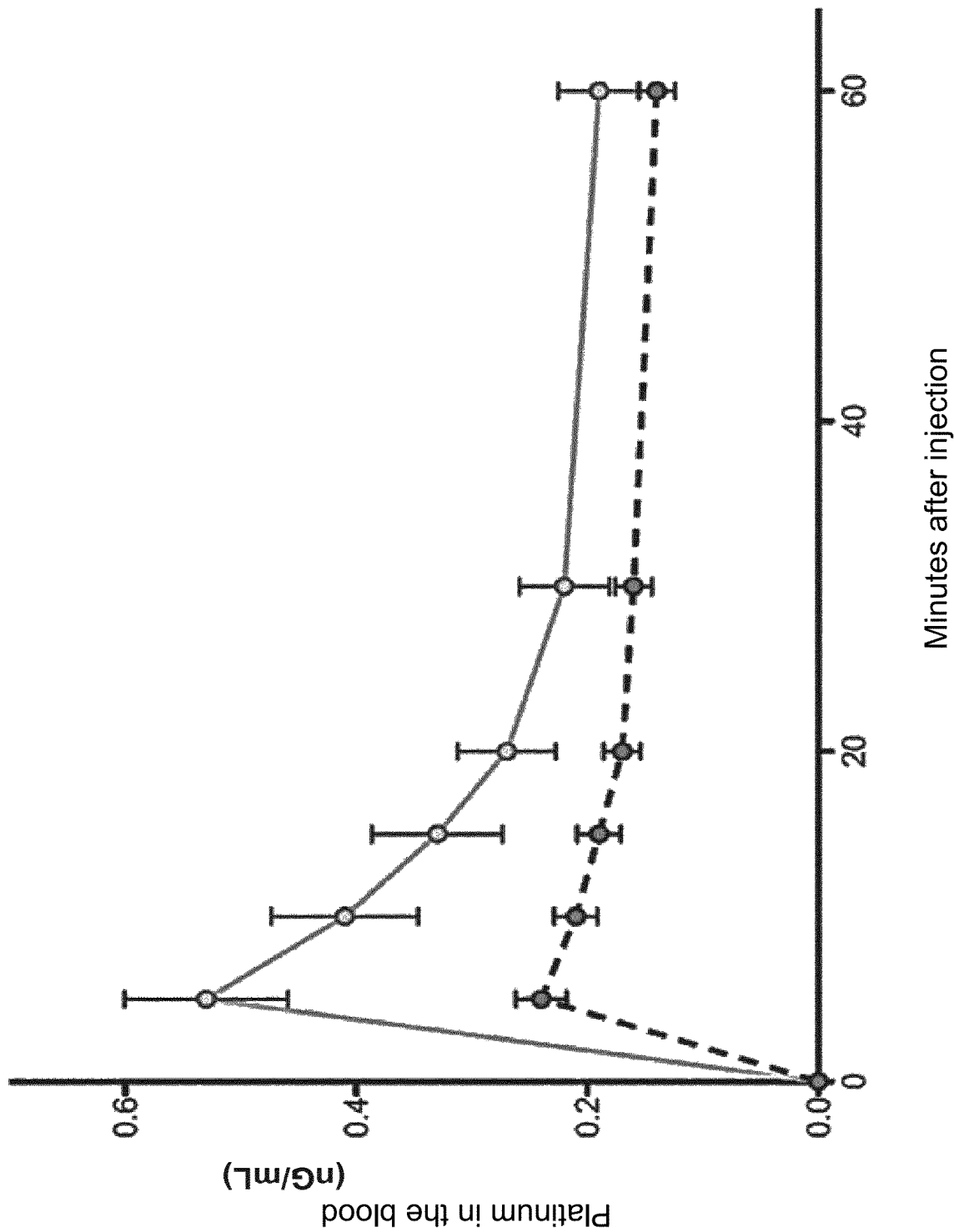
FIG. 14 relates to the plasma pharmacokinetics of oxaliplatin after injection of Pickering lipiodolated emulsions (dotted line) or conventional lipiodolated emulsions (solid line) in the left hepatic arteries.

Pharmacokinetics of Oxaliplatin:

The pharmacokinetics of oxaliplatin after injection of the two types of emulsion are summarised in Table 4 and FIG. 14. The plasma peak of oxaliplatin (Cmax) is significantly lower after injection of the Pickering emulsion as compared to the conventional emulsion (0.49±0.14 ng/mL vs 1.08±0.41 ng/mL, p<0.01). The area under the curve (AUC) at 1 hour is significantly lower for the Pickering emulsion (19.8±5.9 vs 31.8±14.9, p=0.03).

TABLE 4

Average concentration of oxaliplatin (ng/mg) in the liver tissues according to the type of emulsion injected and according to the time of euthanisation.

| | Emulsions: | | |
|---|---|---|---|
| | Conventional | Pickering | |
| Pharmacokinetics | n = 8 rabbits | n = 10 rabbits | |
| C max (nG/mL) | 1.08 ± 0.41 | 0.49 ± 0.14 | p < 0.01* |
| AUC | 31.8 ± 14.9 | 19.8 ± 5.9 | p = 0.03* |
| Euthanisation: H + 1 | n = 4 rabbits (group 1) | n = 5 rabbits (group 2) | |
| Platinum (nG/mG) left lobe | 2.3 ± 1.4 | 0.6 ± 0.2 | p < 0.01* |
| right lobe | 1.3 ± 0.9 | 0.5 ± 0.2 | p < 0.01* |
| L/R ratio | 1.8 ± 0.7 | 1.1 ± 0.2 | p = 0.07 |
| Euthanisation: H + 24 | n = 4 rabbits (group 3) | n = 5 rabbits (group 4) | |
| Platinum (nG/mG) left lobe | 0.4 ± 0.1 | 0.3 ± 0.1 | p = 0.04* |
| right lobe | 0.2 ± 0.4 | 0.2 ± 0.03 | p = 0.5 |
| L/R ratio | 1.7 ± 0.4 | 1.4 ± 1.0 | p = 0.2 |

*Significant difference

Concentration of Oxaliplatin in the Liver and Tissues:

The concentrations of oxaliplatin in the tissues are presented in Tables 4 & 5. At 24 h, the tumour/left lobe ratio is significantly higher with the Pickering emulsion as compared to the conventional emulsion (43.4±42.9 vs 14.5±6.6, p=0.04).

TABLE 5

Average concentration of oxaliplatin (ng/mg) in liver tumours according to the type of emulsion injected and according to the time of euthanisation.

| | Emulsions: | | |
|---|---|---|---|
| | Conventional | Pickering | |
| Euthanisation: H + 1 | n = 6 tumours (group 1) | n = 9 tumours (group 2) | |
| Max tumour diameter (mM) | 14.1 ± 11.1 | 16.0 ± 5.9 | p = 0.6 |
| Platinum: Tumours (nG/mG) | 32.1 ± 21.2 | 17.6 ± 6.7 | p = 0.02* |
| tumour/left lobe ratio | 18.0 ± 10.8 | 33.2 ± 14.9 | p = 0.07 |
| tumour/right lobe ratio | 29.1 ± 11.4 | 40.3 ± 19.3 | p = 0.3 |
| Euthanisation: H + 24 | n = 9 tumours (group 3) | n = 9 tumours (group 4) | |
| Max tumour Diameter (mM) | 15.0 ± 2.9 | 14.5 ± 5.0 | p = 0.4 |
| Platinum: Tumours (nG/mG) | 4.4 ± 3.8 | 10.4 ± 9.8 | p = 0.08 |
| tumour/left lobe ratio | 11.8 ± 8.5 | 44.1 ± 43.3 | p = 0.02* |
| tumour/right lobe ratio | 18.6 ± 17.5 | 45.6 ± 38.5 | p = 0.06 |

*Significant difference

The significantly higher concentration of oxaliplatin in the tumours and left lobes with the conventional emulsion at 1 h is consistent with a low stability level of the emulsion which induces a rapid release of oxaliplatin. Conversely, the slow release of oxaliplatin from Pickering emulsions leads to less systemic exposure of non-target organs (right lobe) at 1 hour and a tendency for exposure of tumours to be greater than 24 hours.

The invention claimed is:

1. A water-in-oil emulsion comprising:
   (a) a continuous oily phase comprising a material selected from the group consisting of ethyl esters of iodized fatty acids from poppy seed oil, medium chain length (MCL) triglycerides having chain lengths between 8 and 12 carbon atoms, and squalene;
   (b) an aqueous phase dispersed in the form of droplets, said aqueous phase comprising biodegradable solid polyester-based nanoparticles, said biodegradable solid polyester-based nanoparticles comprising a polyester selected from the group consisting of polylactic acid (polylactide), polyglycolic acid (polyglycolide), lactide-glycolide copolymers, poly (lactide-co-glycolide), lactide-glycolide-co-polyethylene glycol copolymers, polyorthoesters, polyanhydrides, polybutylacetone, polyvalerolactone, polymalic acid, polylactones, and mixtures thereof, said biodegradable solid polyester-based nanoparticles having a size between 100 nm and 300 nm; and
   (c) at least one therapeutic agent encapsulated inside said droplets;
   wherein the water-in-oil emulsion is a Pickering emulsion;
   wherein the size of the droplets of the aqueous phase is between 10 μm and 100 μm;
   wherein the biodegradable solid polyester-based nanoparticles form a physical barrier between the droplets encapsulating the therapeutic agent and the continuous oily phase in order to stabilize water-oil interface and wherein said water-in-oil emulsion is stable for at least 24 hours.

2. The water-in-oil emulsion according to claim 1, wherein the continuous oily phase comprises squalene.

3. The water-in-oil emulsion according to claim 1, wherein the continuous oily phase comprises ethyl esters of iodized fatty acids from poppy seed.

4. The water-in-oil emulsion according to claim 1, in which the therapeutic agent is selected from the group consisting of immunomodulators, anticancer medicinal products, anti-angiogenic medicinal products, anti-infectious medicinal products, anti-inflammatory medicinal products, imaging contrast agents, radioactive agents, and infectious agents.

5. The water-in-oil emulsion according to claim 4, in which the anticancer medicinal product is selected from the group consisting of: an alkylating agent selected from the group consisting of cyclophosphamide, melphalan, ifosfamide, chlorambucil, busulfan, thiotepa, prednimustine, carmustine, lomustine, semustine, steptozotocin, decarbazine, temozolomide, procarbazine and hexamethylmelamine, a platinum derivative selected from the group consisting of cisplatin, carboplatin and oxaliplatin, cytotoxic antibiotic agents, antimicrotubule agents, anthracyclines, topoisomerase type I and II inhibitors, fluoropyrimidines, cytidine analogues, adenosine analogues, methotrexate, folinic acid, enzymes, antivascular agents, anti-angiogenic agents, antimitotic agents, kinase inhibitors, hormones, monoclonal antibodies, radioelements, oncolytic viruses, and mixtures thereof.

6. The water-in-oil emulsion according to claim 1, in which the therapeutic agent is an anticancer medicinal product selected from the group consisting of: doxorubicin, irinotecan, oxaliplatin, and mixtures thereof.

7. The water-in-oil emulsion according to claim 1, wherein the therapeutic agent is selected from the group consisting of anti-angiogenic monoclonal antibodies, anti-CTLA-4 monoclonal antibodies, anti-PD-1 monoclonal antibodies, anti-PD-L1 monoclonal antibodies, and mixtures thereof.

8. The water-in-oil emulsion according to claim 1, in which the polyester-based nanoparticles further comprise iron oxide particles.

9. A medicinal product comprising the water-in-oil emulsion according to claim 1.

10. A pharmaceutical composition comprising the water-in-oil emulsion according to claim 1, and at least one pharmaceutically acceptable excipient.

* * * * *